United States Patent [19]
Hattori et al.

[11] 3,942,698
[45] Mar. 9, 1976

[54] HELICAL-SCAN VIDEO TAPE RECORDER HAVING A TAPE-LOOSENING MECHANISM

[75] Inventors: Masataka Hattori; Hisao Toda, both of Tokyo, Japan

[73] Assignee: Nippon Electric Co., Ltd., Tokyo, Japan

[22] Filed: Feb. 27, 1975

[21] Appl. No.: 553,504

[30] Foreign Application Priority Data
Mar. 4, 1974   Japan.............................. 49-25004

[52] U.S. Cl. ................. 226/50; 226/117; 226/154; 226/176
[51] Int. Cl.² ......................................... B65H 17/20
[58] Field of Search ....... 226/24, 50, 153, 154, 155, 226/174, 176, 117; 360/130

[56] References Cited
UNITED STATES PATENTS
3,666,152   5/1972   Cogar .................................... 226/50
3,700,152   10/1972  Warren ........................... 226/154 X

*Primary Examiner*—Richard A. Schacher
*Attorney, Agent, or Firm*—Hopgood, Calimafde, Kalil, Blaustein & Lieberman

[57] ABSTRACT

An apparatus for scanning a magnetic video tape includes a drum and a rotatable magnetic head. A freely rotatable roller and a loosening mechanism are positioned on opposite sides of the tape. When the tape stops, the loosening mechanism is driven toward the roller and thus engages the tape between the loosening mechanism and the roller. Rotation of the loosening mechanism then loosens the tape.

7 Claims, 8 Drawing Figures

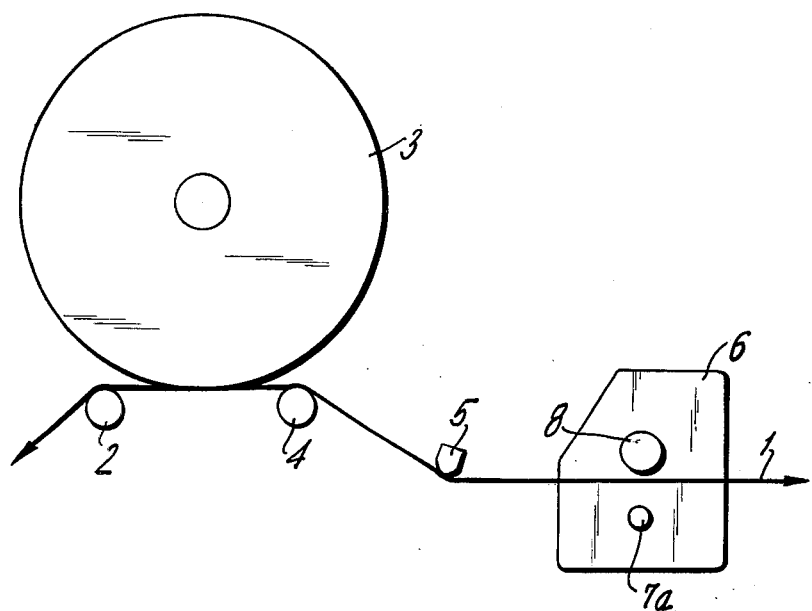
FIG.1
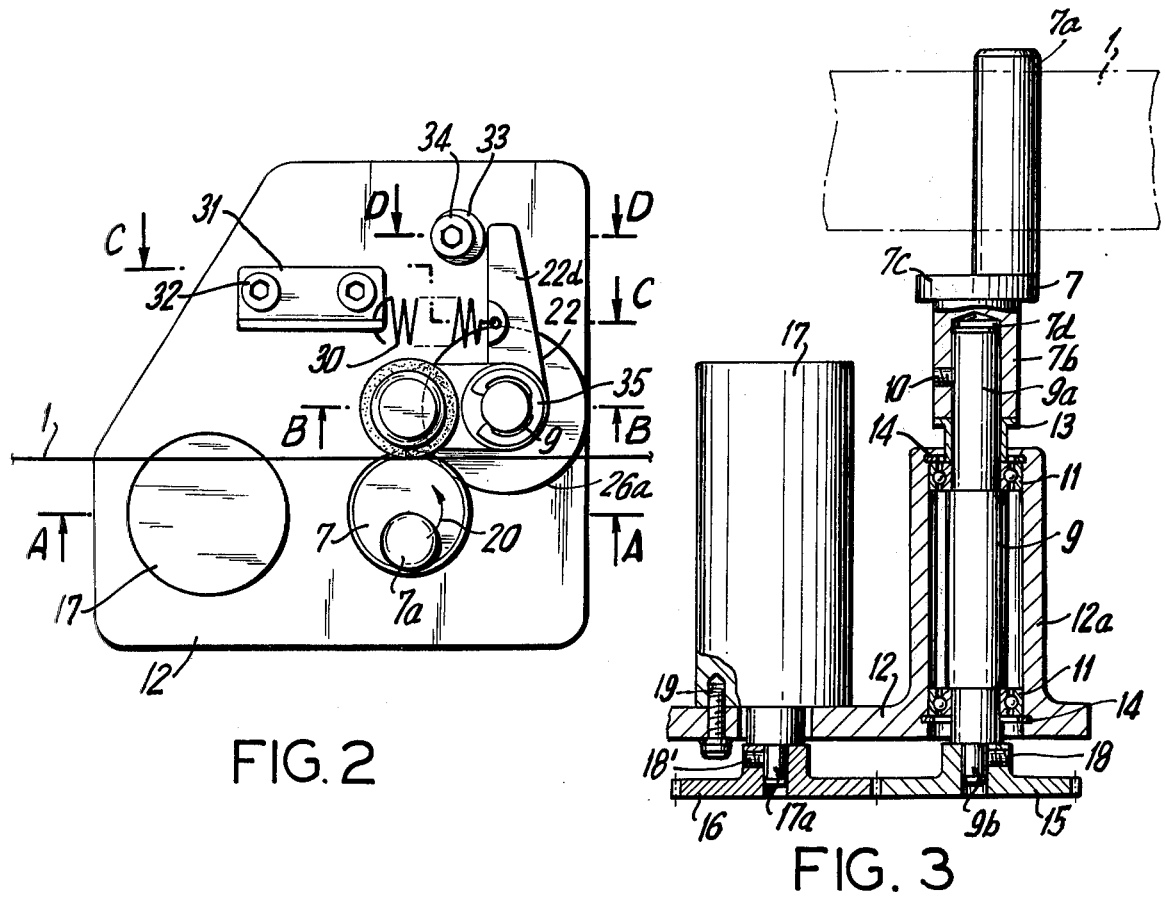
FIG.2
FIG.3

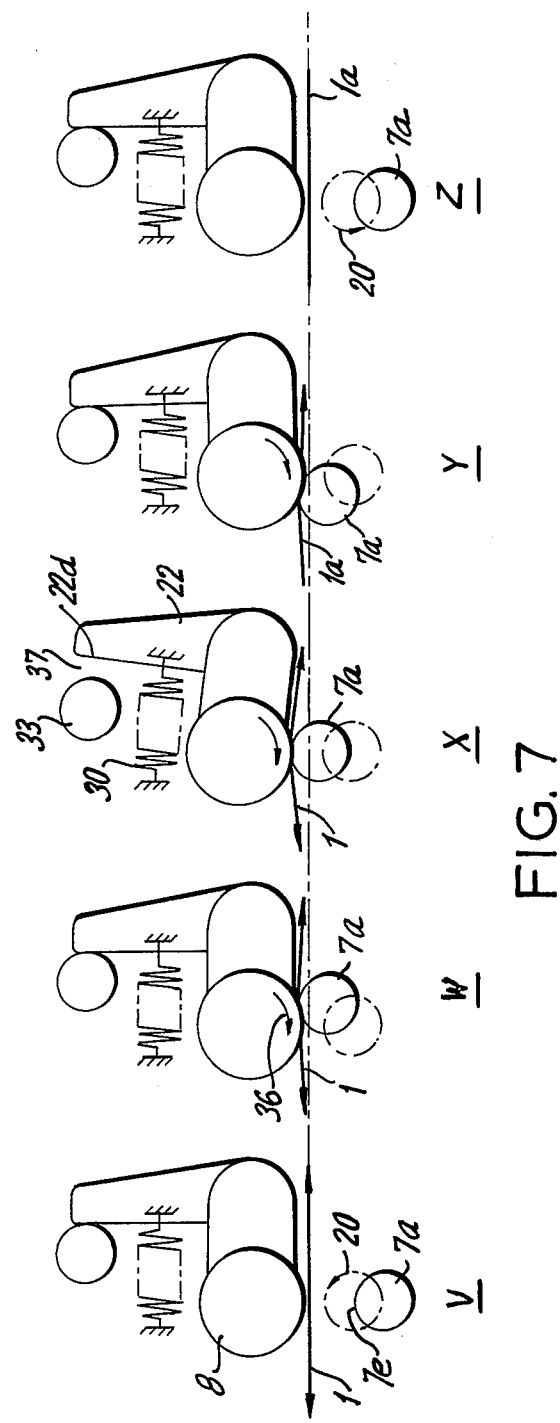

HELICAL-SCAN VIDEO TAPE RECORDER HAVING A TAPE-LOOSENING MECHANISM

BACKGROUND OF THE INVENTION

This invention relates to a new and improved helical-scan video tape recorder (VTR), in which a magnetic tape is scanned at an angle with respect to the longitudinal direction of the tape to form a slanted track or record thereon, and more particularly to such a device having a tape-loosening mechanism.

Ordinarily, in a helical-scan VTR, when a running magnetic tape is brought to a stop, it is held tightly under tension and remains in engagement with the peripheral surfaces of adjacent component parts such as guide posts, a stationary head and a guide drum. The tape may thus occasionally adhere to the contacting component surfaces due to a type of vacuum condition to which the contacting ares are subjected or due to dew formation in the narrow air spaces or layers surrounding the contacting areas. Particularly, in the event of dew formation, when the dew once deposited evaporates, the tape adhesion may be enhanced to such an extent that the tape sticks tightly to the adjacent component surfaces. Such sticking phenomenon of the magnetic tape is likely to occur particularly on the outer peripheral surface of the guide drum or a similar component surface with which the tape is placed in contact along a substantial and continuous length thereof. If the magnetic tape is driven and starts running while adhering to the adjacent component or components or while deposits of dew are present, it will be subjected to unduly large tensioning because of the adhesion and in some cases it will fail to start, remaining stuck to the contacting component surfaces. Thus, the phenomenon of tape sticking materially impairs the operational performance required of a helical-scan VTR.

Accordingly, it is an object of the present invention to provide a helical-scan VTR having a tape-loosening mechanism designed to prevent any tape-sticking phenomenon which may occur along the contacting surface of the magnetic tape.

Summary of the Present Invention

According to the present invention, there is provided a helical-scan VTR in which a freely rotatable roller, and a shaft adapted to effect cranking motion and having a surface engageable with the peripheral surface of said freely rotatable roller are installed on opposite sides of the magnetic tape upon cranking motion of the shaft, the magnetic tape is engaged between the shaft and the freely rotatable roller and fed under the friction of the surface of said shaft so as to be loosened.

For a more complete understanding of the present invention, reference may be had to the detailed description below taken in conjunction with the accompanying drawings wherein:

FIG. 1 is a schematic view of apparatus embodying the present invention;

FIG. 2 is a plan view of a tape-loosening mechanism of the apparatus of FIG. 1;

FIG. 3 is a cross-sectional view taken along the line A—A in FIG. 2;

FIG. 7 is a diagrammatic view illustrating a number of successive stages of the loosening operation of the embodiment.

DESCRIPTION OF THE PREFERRED EMBODIMENT

Figure 4:
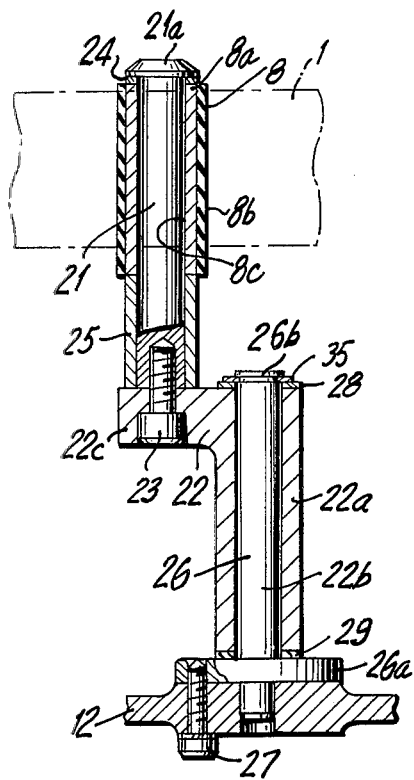
FIG. 4 is a cross-sectional view taken along the line B—B in FIG. 2.
Figure 5:
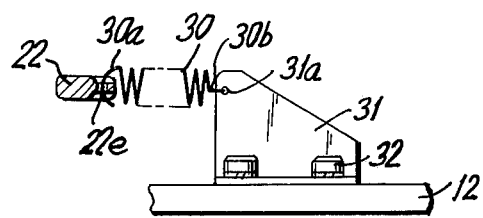
FIG. 5 is a cross-sectional view taken along the line C—C in FIG. 2.
Figure 6:
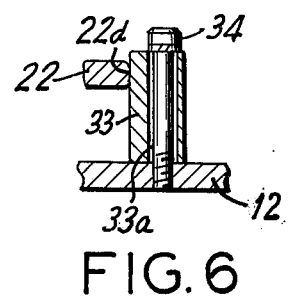
FIG. 6 is a cross-sectional view taken along the line D—D in FIG. 2.

For clarity of illustration, only a tape-loosening mechanism will be described in detail, with the description of the conventional control means for brake-release and temporary positioning of movable component parts and of the construction of the guide drum and rotary magnetic head and operational control thereof being omitted.

FIG. 1 shows a magnetic tape 1 arranged to pass over a guide post 2 and helically 360° around a drum 3 making contact therewith, and further over a guide post 4, an audio head 5 and a tape-loosening mechanism 6, without making any contact with a crank pin 7a of a tape drive shaft 7 and a friction roller 8. The drive shaft 7 and the crank pin 7a of the loosening mechanism 6 form a crank the function of which is to loosen the tape when driven in response to an interruption in the movement of the tape.

FIGS. 2 and 3 shows the tape drive shaft 7, made of nonmagnetic material such as stainless steel, formed at one end with the crank pin or drive portion 7a, which forms a right circular cylinder having an axial length larger than the width of the magnetic tape. The outer peripheral surface of the crank portion 7a is somewhat rough-finished, for example, by sandblasting to exhibit a substantially increased coefficient of friction. The tape drive shaft 7 also has a boss 7b formed at the other end thereof and is thus formed as an integral structure including crank portion 7a, boss 7b and flange 7c. The boss 7b is axially bored as at 7d. The axes of bore 7d and crank portion 7a are parallel to and spaced from each other. The tape drive shaft 7, bored at 7d, is fitted over one end portion 9a of a shaft 9 and held in place by a set screw 10. The shaft 9 is journaled in a bearing portion 12a of a base plate 12 through the intermediary of a pair of ball bearings 11 for smooth rotation. A gear 15 is fixed to the opposite end 9b of the shaft 9 by means of a set screw 18. A collar 13 is provided to position the tape drive shaft 7 vertically or axially thereof and retainers 14 serve to prevent dislocation of the respective ball bearings 11. A gear 16 is arranged in mesh with the gear 15 and fixed to the output shaft 17a of a motor 17 by means of a set screw 18'. The motor 17, which forms a drive means is fixed to the base plate 12 by screw means 19 and is arranged to start with a signal from a control means (not shown) when the magnetic tape 1 comes to a stop. The output power of the motor 17 is transmitted through the meshing gears 15 and 16 to the shaft 9 and hence to the tape drive shaft 7. The motor 17 is controlled in a manner such that the tape drive shaft 7 is driven 360° about its axis or the bore 7d in a direction indicated by the arrow 20 and comes to a stop at its initial starting position. In this manner, the tape drive shaft 7 and crank portion 7a are driven to make one revolution each time the magnetic tape is brought to a stop. In this connection, the starting position of the tape drive shaft 7 is so determined that the crank portion 7a comes to rest at the position farthest from the magnetic tape 1 lest the normal tape running should be hampered.

Referring to FIGS. 2, 4, 5, and 6, the friction roller 8 comprises a core 8a of nonmagnetic material, for example, phosphor bronze, covered by soft elastic material 8b having a relatively high coefficient of friction, for example, urethane rubber and is finished as a circular cylinder having a length greater than than the width of the magnetic tape. With a bore 8c formed in the core 8a, the friction roller 8 is fitted over a shaft 21 for free rotation. A flange 21a is integrally formed on the shaft 21 at one end thereof to restrain axial displacement of the friction roller 8. The shaft 21 is fixed at the other end to one end 22c of an arm 22 by screw means 23. Fitted over the opposite end portions of the shaft 21 are collars 24 and 25 made of low friction material such as flouroplastic so that the friction roller 8 may rotate smoothly despite the frictional drag on the opposite end faces thereof. The arm 22 is formed at its base end with a boss 22a, which is bored at 22 b to fit over a shaft 26 for smooth rotation about the axis thereof. The shaft 26 is formed at one end with a flange 26a, which is secured to the base plate 12 by screw means 27. Formed in the shaft 26 at its other end is an annular groove 26b which receives a retainer 35 to restrain axial displacement of the arm 22. Collars 28 and 29 serve the same purpose as the collars 24 and 25 for the friction roller 8. An arm portion 22d of the arm member 22 is formed intermediate the ends thereof with an aperture 22e through which one end 30a of a spring 30 is hooked. The other end 30b of the spring is hooked through an aperture 31a formed in a portion of an anchor bracket 31, which is secured to the base plate 12 by screw means 32. In this manner, the spring 30 is held under tension to bias the arm member 22 in a predetermined direction. An eccentric stop 33 is displaced for pressure engagement with the arm portion 22d in order to define the position of the friction roller against the bias of spring 30, and is adjustable in eccentricity to control the position of the friction roller thereby to adjust the distance over which the crank portion 7a travels maintaining contact and engagement with the friction roller 8 so as to impart an optimum amount of slack or looseness to the magnetic tape, as will be described later in further detail. The eccentric stop 33 is shaped generally cylindrically and has formed therein an off-center bore 33a through which a screw 34 is fitted to secure the stop to the base plate 12.

A description of the operation of the apparatus described above will now be given. Referring to FIG. 7, the crank portion 7a produces a cranking motion about the axis of tape drive shaft 7, as shown in the order of V, W, X, Y and after Z, and making one complete revolution, comes to rest at its initial position to complete its cycle of operation. 'V' represents a state assumed when the magnetic tape 1 under tension is brought to a stop and the crank portion 7a is about to start its cranking motion about the axis 7e in the direction of the arrow 20. In this state, the magnetic tape 1 is in its normal running position clear of the friction roller 8. 'W' represents a state assumed when the magnetic tape 1 has been pushed just slightly by the crank portion 7a to make contact with the friction roller 8. In this state, the magnetic tape 1, crank portion 7a and friction roller 8 are in interengaging relation with each other, and, under the pressure of engagement, the friction roller 8 is about to be driven in a direction indicated by the arrow 36 together with the magnetic tape 1. 'X' represents an intermediate state assumed while the friction roller 8 is rotating and in which state the arm 22d is spaced from the eccentric stopper 33 as indicated at 37 and the friction roller 8 is continuously pressed against the crank portion 7a under the bias of spring 30 to maintain interengagement with the magnetic tape 1. 'Y' represents a state assumed when the interengagement of the crank portion 7a, magnetic tape 1 and friction roller 8 have been just released. 'Z' represents a state assumed when the crank portion 7a has further advanced in the direction of the arrow 20 to restore its initial position, thus allowing the magnetic tape 1 to resume its normal running position in a loosened state. In this manner, the previously tensioned magnetic tape 1 is loosened under the action of the crank portion 7a to an extent corresponding to the distance over which the tape is driven backward during the period of interengagement including states W, X and Y.

Figure 8:
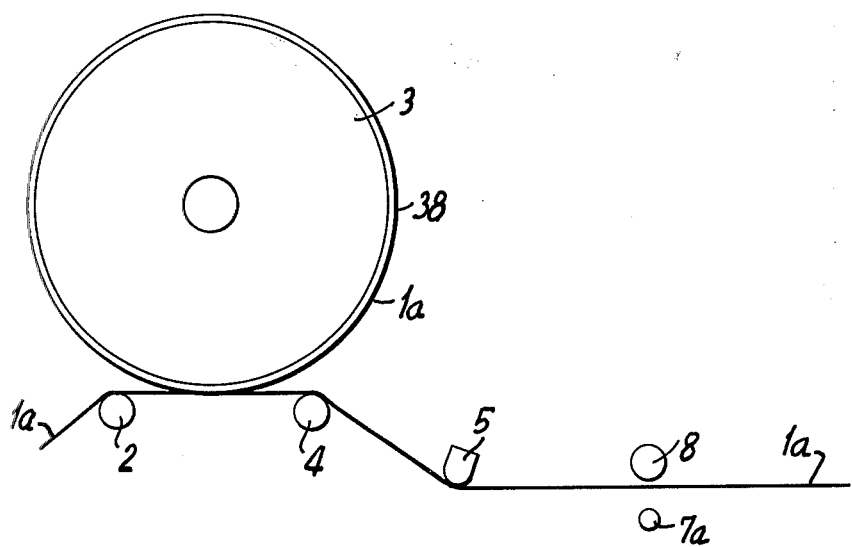
FIG. 8 is a schematic view showing the loosened magnetic tape.

The extent of loosening or the amount of slack imparted to the tape can be readily adjusted within predetermined limits by adjusting the eccentric stop 33 to vary the initial position of the friction roller 8. The loosening operation is performed not only to release the magnetic tape 1 from tension but is also to afford a certain slacking of tape such slacking is expended in forming a space 38 (FIG. 8) between the outer peripheral surface of the guide drum 3 and the magnetic tape 1 as the tape is floated off the drum surface under the pressure of air blown out of the guide drum through small openings in the drum wall, under the air moving and impelling effect of the rotary magnetic head arranged in the drum. Under this condition, the magnetic tape, once loosened, remains in its normal course within the whole tape running system expecting the region around the guide drum.

The tape loosening function, according to the present invention, is further ensured by auxiliary operations such as those described below:

1. Reel brakes are released to allow the reels to rotate when the magnetic tape is fed back in the direction of the guide drum;
2. The rotary magnetic head is left to continue its rotation even after the tape has come to stop. Rotation of the rotary magnetic head, which is arranged in the guide drum, acts to disturb the air within the drum so that a portion of the air is driven out of the drum through small openings in the wall thereof and acts upon the magnetic tape helically wrapped about the outer peripheral surface of the drum to expand such tape radially outwardly. Under this action, the magnetic tape lying on the drum is floated off the drum surface with its radius increased as it is loosened and
3. To prevent the loosened tape from being again tensioned under the action of a spring or other means, movable members such as tension arms are temporarily held against movement simultaneously with the stopping of the magnetic tape.

The tape-loosening operation and accompanying auxiliary operations described above should be effected as rapidly as possible to maximize their effect of preventing the tape-sticking phenomenon. The rotary magnetic head can be brought to a stop after the lapse of an appropriate time period from the begining of the loosening of the magnetic tape, without any danger of incurring any tape-sticking phenomenon. As will be apparent from the above description, a number of advantages are gained by the use of a tape-loosening mechanism of the present invention. In the first place, the magnetic tape once loosened is held free from engagement with the tape transport system of the helical-scan VTR with respect to every contacting surface of the system and any tape-sticking phenomenon is effectively avoided, ensuring easy and accurate tape starting. Moreover, the space 38 formed between the outer peripheral surface of the guide drum and the magnetic tape enables the rotary magnetic head to continue to rotate without any contact with the magnetic tape. This means that the magnetic head is kept free from wear and that the magnetic tape is not damaged in any manner despite the rotation of the magnetic head, which would otherwise rub a portion of the tape at rest in a continuous fashion.

The above-described embodiment is intended to be illustrative of the concept of the invention. Numerous variations and modifications thereof within the spirit and scope of the invention will occur to those skilled in the art.

What is claimed is:

1. An apparatus for scanning a magnetic video tape including a drum about which the tape is wound in a helical manner and a rotary magnetic head, wherein the improvement comprises:
   a freely rotatable roller disposed along the path of the magnetic tape;
   a tape loosening means disposed on the side of the tape opposite the roller for movement toward the roller whereby the tape is engaged between the loosening means and the roller; and
   drive means for moving the loosening means toward the roller and rotating the loosening means so as to loosen the tape in response to an interruption of tape movement.

2. The apparatus of claim 1, wherein the improvement further comprises a pivotable arm on which the roller is mounted and a spring which biases the arm for movement of the roller with respect to the tape.

3. The apparatus of claim 2, wherein the improvement further comprises an eccentrically rotatable stop against which the arm is biased by the spring, the position of the arm thus being adjustable by the rotation of the stop to vary the amount of loosening action affected by actuation of the drive means.

4. The apparatus of claim 1, wherein the drive means includes an electric motor.

5. The apparatus of claim 1, wherein the drum is provided with a plurality of holes through which air can be blown to separate the loosened tape from the drum.

6. The apparatus of claim 1, wherein the tape loosening mechanism comprises a crank formed by a tape drive shaft and a crank pin for direct engagement with the tape, the center of the crank pin being spaced from the center of the tape drive shaft.

7. The apparatus of claim 1, wherein the drive means, when actuated by an interruption of the tape movement, causes one complete revolution of the tape drive shaft.

* * * * *